United States Patent [19]

Zschocke et al.

[11] Patent Number: 4,593,884
[45] Date of Patent: Jun. 10, 1986

[54] CONTINUOUS-ADVANCE HYDRAULIC CABLE MOVER

[75] Inventors: Christian Zschocke; Hans Forchheim, both of Erdmannsdorf, German Democratic Rep.

[73] Assignee: Bauakademie der Deutschen Demokratischen Republik, Berlin, German Democratic Rep.

[21] Appl. No.: 694,642

[22] Filed: Jan. 24, 1985

[30] Foreign Application Priority Data

Jan. 24, 1984 [DD] German Democratic Rep. ... 259575

[51] Int. Cl.⁴ .................................... B66F 19/00
[52] U.S. Cl. .................................... 254/264; 254/228; 226/112; 74/128
[58] Field of Search ............... 254/228, 384, 264, 380; 226/112, 167, 165; 24/136 R, 136 L; 74/128

[56] References Cited

U.S. PATENT DOCUMENTS

| | | | |
|---|---|---|---|
| 3,266,776 | 8/1966 | Catu | 254/228 X |
| 3,474,946 | 10/1969 | Desplats et al. | 226/112 |
| 4,448,393 | 5/1984 | Habegger et al. | 254/264 |
| 4,456,226 | 6/1984 | Stumpmeier | 254/264 |

FOREIGN PATENT DOCUMENTS 1255269  11/1967  Fed. Rep. of Germany ...... 254/264

*Primary Examiner*—Stuart S. Levy
*Assistant Examiner*—Katherine Matecki
*Attorney, Agent, or Firm*—Michael J. Striker

[57] ABSTRACT

A cable mover has a generally stationary support, a tube centered on an axis and having a pair of axially opposite ends, a swivel joint carrying the tube on the support and permitting the tube to move only nonaxially thereon, and respective axially double-acting actuators carried on the tube ends. Respective double-acting grippers are carried on the actuators. The cable axially traverses the grippers, actuators, and tube. The grippers each have two sets of wedge jaws engageable with the cable, one of the sets of each gripper being effective to wedge in one axial direction with the cable and to slide in the other direction, and the other set of each gripper being oppositely effective. Each gripper also has a disabling body displaceable between end positions and through a central position with the body disabling one of the respective sets of jaws in one end position, the other set of jaws in the other end position, and neither set of jaws in the central position. A hydraulic controller is connected to the actuators and to the disabling means for reversing the actuators and the disabling means in accordance with the position of the actuators.

8 Claims, 2 Drawing Figures

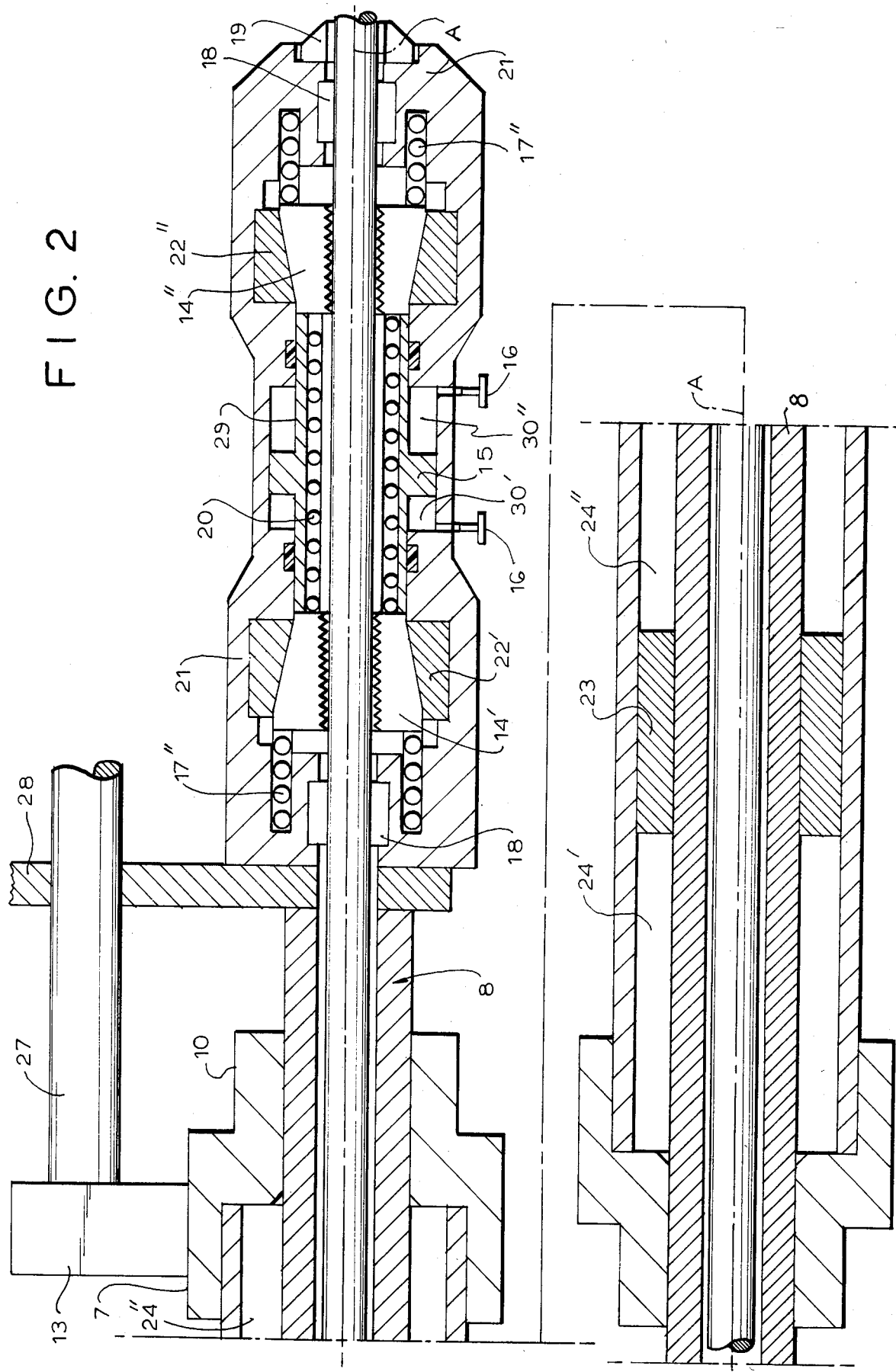

CONTINUOUS-ADVANCE HYDRAULIC CABLE MOVER

FIELD OF THE INVENTION

The present invention relates to an apparatus for pulling in and letting out a flexible element such as a cable. More particularly this invention concerns a device that is not of the drum or winch type and that can slowly and powerfully pull in or pay out a straight and even tensioned cable or the like.

BACKGROUND OF THE INVENTION

In, for instance, the transport of a load on a fluid cushion it is necessary to pull in or pay out a cable or the like attached to the load but it is impossible to wind this element around a drum. Instead the cable must pass under tension straight through the cable mover.

Such a mover is known which has a normally horizontal lever pivotal about a horizontal transverse axis on a fixed support and having two attachments flanking the pivot. Arms pivoted on the attachments each carry a pair of jaws between which the cable passes, and which automatically lock on and grip the cable when pulled up along it in one direction, but which slide in the other direction. Thus as the lever is rocked back and forth about its axis the cable is first gripped and lifted by one of the grippers while the other slides down it, and then is clenched by the other gripper as it lifts while the one gripper slides down the cable to start lifting again. With a long lever arm the system can exert enormous forces, and can be operated by a crank or hydraulic cylinder for nonmanual operation.

Such an arrangement advances the cable and its load in steps. This jerky advance frequently damages the load itself, and subjects the cable to peak loads well in excess of the actual mass being lifted. The concentrated gripping force at one location is compounded by the start-and-stop advance often causing whichever set of grippers is active to bite into and damage the cable. It is also standard that such devices are only capable of hauling the cable with great force in one direction and in the opposite paying-out direction are relatively weak.

OBJECTS OF THE INVENTION

It is therefore an object of the present invention to provide an improved straight-line cable mover.

Another object is the provision of such a straight-line cable mover which overcomes the above-given disadvantages, that is which displaces the cable or the like continuously and that can operate with great force in either direction on the cable.

SUMMARY OF THE INVENTION

A cable mover according to the invention has a generally stationary support, a tube centered on an axis and having a pair of axially opposite ends, a swivel joint carrying the tube on the support and permitting the tube to move only nonaxially thereon, and respective axially double-acting actuators carried on the tube ends. Respective double-acting grippers are carried on the actuators. The cable axially traverses the grippers, actuators, and tube. The grippers each have two sets of wedge jaws engageable with the cable, one of the sets of each gripper being effective to wedge in one axial direction with the cable and to slide in the other direction, and the other set of each gripper being oppositely effective. Each gripper also has a disabling body displaceable between end positions and through a central position with the body disabling one of the respective sets of jaws in one end position, the other set of jaws in the other end position, and neither set of jaws in the central position. A hydraulic controller is connected to the actuators and to the disabling means for reversing the actuators and the disabling means in accordance with the position of the actuators.

According to further features of this invention the actuators are double-acting hydraulic rams having each having a tubular piston and piston rod centered on the axis. In addition the disabling bodies are double-acting hydraulic pistons. Guide bushings are provided in the grippers to slidably guide the cable axially through the mover. The controller has sensors for detecting the positions of the actuator pistons and respective springs urging the jaws into wedging engagement with the cable. These springs are bedded in an elastomer.

The controller according to the invention alternately and oppositely displaces the grippers for continuous displacement of the cable. Thus each gripper is displaced by the respective actuator through a working stroke in which the gripper is grabbing the cable and pulling it toward or pushing it away from the other gripper, and a return stroke in which the gripper is sliding on the cable opposite to the direction of movement of the cable while the other gripper is advancing the cable. The return stroke of each gripper starts after the working stroke of the other gripper has started and ends before the working stroke of the other gripper has ended, so that the cable moves continuously, and in fact is engaged and advanced briefly once each cycle by both grippers. This offset in time is achievable by means of an electronic controller and appropriate solenoid valves, or can be done hydraulically by making the returning and hence unloaded gripper move more rapidly, and simply automatically reversing each actuator when its reaches its inner or when both reach their inner or outer positions.

DESCRIPTION OF THE DRAWING

The above and other features and advantages will become more readily apparent from the following, reference being made to the accompanying drawing in which:

FIG. 2 is a section taken along line II—II of FIG. 1.

SPECIFIC DESCRIPTION

Figure 1:
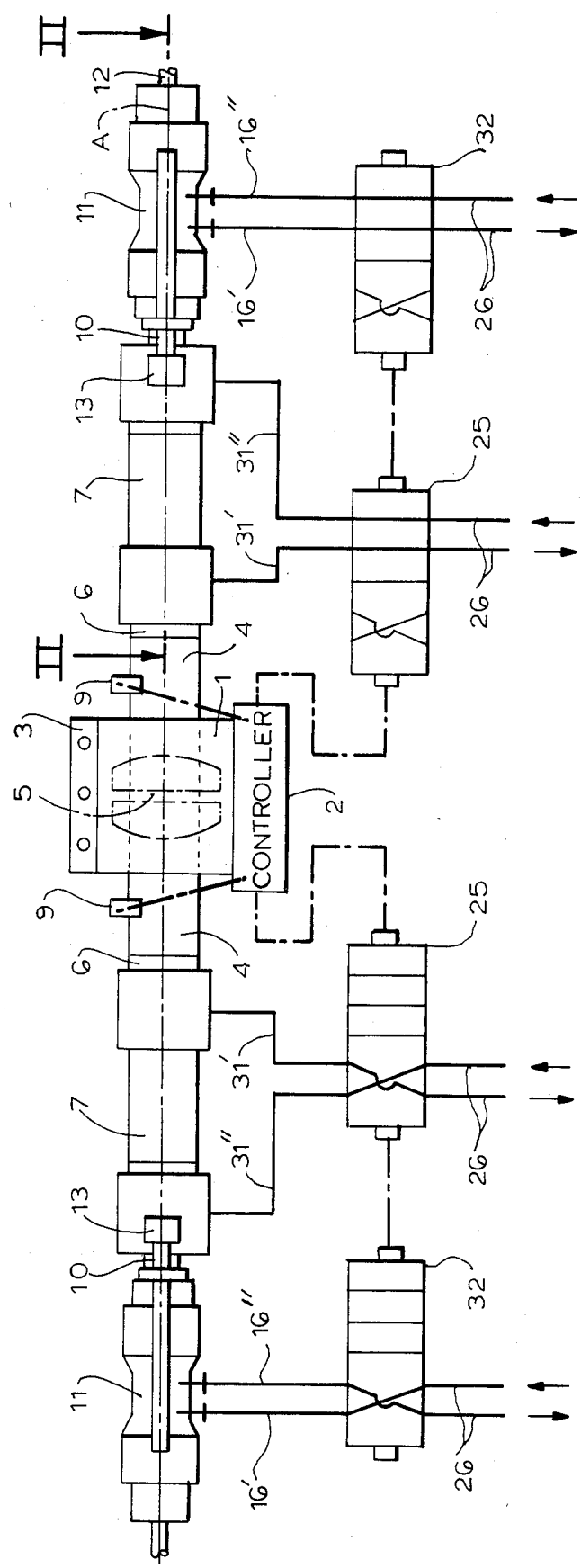
FIG. 1 is a partly diagrammatic top view of a cable mover according to this invention.

As seen in FIG. 1 the system of this invention extends along an axis A of a straight section 12 of cable. A stationary support 3, for instance bolted to a deck, carries a main tube 4 by means of a universal or cardan joint 5 permitting this tube 4 to swivel but not move in the support 1 either longitudinally parallel to the axis or rotationally about the axis. The outer ends 6 of the tube 4 carry identical actuators 7 whose outer ends 10 in turn carry identical respective gripping units 11.

Each actuator 7 is basically as shown in FIG. 2 a hydraulic double-acting cylinder in which a tubular piston 23 carried on a tubular throughgoing piston rod 8 defines a pair of compartments 24′ and 24″. Respective conduits 31′ and 31″ from these compartments 24′ and 24″ are connected to a four-port two-position reversing valve 25 which can connect these conduits 31′ and 31″ to high-pressure and low-pressure lines 26 of a pressure source. In the illustrated position the outer compartment 24" of each actuator 7 is connected to the high-pressure side and the inner compartment 24' to the low-pressure side, to pull the respective piston rod 8 inward until the respective gripper 11 presses axially inward, that is toward the center joint 5, against the respective outer actuator end 10. When the actuators 7 are oppositely pressurized, the gripper 11 is pushed axially out, away from the joint 5.

Each gripper 11 has a tubular body 21 that carries two axially oppositely tapering sets of wedge jaws 14' and 14" in respective oppositely tapered seat rings 22' and 22". Respective axially oppositely effective springs 17' and 17" seated in an elastomer push the respective jaws 14' and 14" in opposite directions tending to wedge them between the cable 12 running through the body 21 and the respective seat ring. A weaker compression spring is braced axially between the inner and outer jaws 14' and 14" and urges them apart with a force substantially less than that of the springs 17' and 17". Thus the inner jaws 14', when wedged between the cable 12 and the respective ring 22', will solidly impede motion of the cable 12 axially outward but will slide on the cable 12 if same is moving inward. The outer jaws 14" are oppositely effective to wedge against the cable 12 in the opposite axial direction.

At its outer end the body 21 is provided with a scraper 19 that prevents foreign matter that is stuck on the cable 12 from being drawn into the gripper 11. In addition guide sleeves 18 are provided at the inner and outer ends of the body 21 to keep the cable 12 centered therein.

Centrally each body 21 receives an axially displaceable annular piston 15 having a tubular piston rod or sleeve 29 centered on the axis A and axially traversed by the cable 12. This piston 15 defines inner and outer compartments 30' and 30" which can be pressurized alternately via respective conduits 16' and 16" and reversing valves 32 from the source lines 26. The overall length of the sleeve 29 is such that when in the illustrated center position it is out of contact at both ends with the jaws 14' and 14" and the jaws 14' and 14" are both wedged against the cable 12, preventing it from moving in either direction relative to the gripper 11. When the compartment 30' is pressurized the jaws 14" are pushed back against their springs 17" and the cable 12 can move inward through gripper 11, as in this direction the jaws 14' will just slide on the cable 12. Pressurizing the compartment 30" oppositely allows the cable 12 to slip axially outward through the gripper 11.

The outer ends 10 of the actuators 7 carry mounts 13 from which respective rods 27 extend outward parallel to the axis A and through axial bores in plates 28 carried on the inner ends of the respective gripper bodies 21. This guide structure allows each actuator 7 to move axially relative to the respective gripper body 21 but prevents these parts from rotating about the axis A relative to each other. Thus any torsion in the cable 12 will not be able to twist the grippers 12 relative to the actuators, preventing the application of angular force to the jaws 14' and 14" and thereby increasing their ability to hold.

In one position of each valve 32 one of the sets of jaws 14' or 14" is impeded from wedging on the cable and in the other position of each valve 32 the other set of jaws 14" or 14' is similarly disabled by the sleeve 29. The valves 32 are set oppositely so that as will be described below one of the grippers 11 can slide on the cable in a direction opposite its displacement which is caused by the other gripper.

The tube 4 is provided with end switches 9 that may be magnetic sensors that detect the positions of the respective piston rods 8 and that are connected to an electrical controller 2 connected in turn to the solenoids of the valves 25 to reverse these valves 25 oppositely so that the two grippers 11 are drawn axially inward at generally the same time then axially outward. This controller 2 is also connected to the solenoids of the valves 32 to operate them synchronously with the valves 25 and in accordance with which direction the cable 12 is to be moved in.

In the arrangement illustrated in FIG. 1 the valves 25 are set such that both of the outer compartments 30' and 30" are pressurized to pull both grippers 11 in. In addition the valve 32 for the right-hand gripper 11 is set to pressurize its outer compartment 30" and thereby allow the right-hand gripper 11 to move axially to the left on the cable 12, while the valve 32 for the left-hand gripper 11 is set so that the outer jaws 14" of same are released, but the inner jaws 14' are locked so that the cable 12 will be pulled axially to the right, slipping through the right-hand gripper.

The gripper 11 that is on its return stroke, the one that is sliding on the cable 12 and not entraining it, will move somewhat faster than the other gripper which is on its pull stroke. When the returning gripper is at the end of its stroke as determined by the sensor 9, the respective valves 25 and 32 are reversed so that the gripper 11 changes direction and locks on the cable 12. Shortly thereafter the pulling gripper 11 will reach the end of its stroke and its valves 25 and 32 will be reversed to slide it back out on the cable 12 that meanwhile has been picked up and is being pushed along by the other gripper. At the end of its return stroke the valves 25 and 32 are again reversed, with some overlap of engagement so that the cable 12 is moved continuously, the two grippers 11 working in a hand-over-hand style.

The direction of pull can be changed simply by reversing the two valves 32. The time delay imposed by the controller so that one gripper 11 engages and starts to pull or push the cable 12 before the other gripper 11 releases eliminates high peak loads and therefore treats the entire traction system and the load much more gently than the prior-art stepping systems.

If the system loses pressure the grippers 11 will lock on the cable 12 and will at most let the cable move in the tube 4 through a distance equal to half the axial stroke of the grippers 11. Thus the system is made self-locking without the provision of any extra brake clamps, sensors, or the like.

We claim:
1. A cable mover comprising:
a generally stationary support;
a tube centered on an axis and having a pair of axially opposite ends;
a swivel joint carrying the tube on the support and permitting the tube to move only nonaxially thereon;
respective axially double-acting actuators carried on the tube ends;
respective double-acting grippers carried on the actuators, the cable axially traversing the grippers, actuators, and tube, the grippers each having
two sets of wedge jaws engageable with the cable, one of the sets of each gripper engaging the cable when moved in a first axial direction with respect to the cable and sliding along the cable when moved in a second axial direction, and the other set of each gripper engaging the cable when moved in said second axial direction and sliding along the cable when moved in said first axial direction, and means including a disabling body displaceable between two end positions and through a central position, the body disabling one of the sets of jaws from engaging the cable in one end position, the other set of jaws in the other end position, and neither set of jaws in the central position; and hydraulic control means connected to the actuators and to the disabling means for reversing the actuators and the disabling means in accordance with the position of the actuators.

2. The cable mover defined in claim 1 wherein the actuators are double-acting hydraulic rams having each having a tubular piston and piston rod centered on the axis.

3. The cable mover defined in claim 2 wherein the disabling bodies are double-acting hydraulic pistons.

4. The cable mover defined in claim 2, further comprising guide bushings in the grippers for slidably guiding the cable axially through the mover.

5. The cable mover defined in claim 2 wherein the control means includes sensors for detecting the positions of the actuator pistons.

6. The cable mover defined in claim 2, further comprising respective springs urging the jaws into wedging engagement with the cable.

7. The cable mover defined in claim 6 wherein the springs are bedded in an elastomer.

8. The cable mover defined in claim 7 wherein the control means alternately and oppositely displaces the grippers for continuous displacement of the cable.

* * * * *